(12) United States Patent
Wu, Jr. et al.

(10) Patent No.: US 10,116,230 B2
(45) Date of Patent: Oct. 30, 2018

(54) METHODS, CIRCUITS AND ARTICLES OF MANUFACTURE FOR CONFIGURING DC OUTPUT FILTER CIRCUITS

(71) Applicant: Eaton Capital Unlimited Company, Dublin (IE)

(72) Inventors: Tangshun Wu, Jr., Shenzhen (CN); Jun Xu, Shanghai (CN); Tiefu Zhao, Fox Point, WI (US); Birger Pahl, Milwaukee, WI (US)

(73) Assignee: Eaton Capital Unlimited Company (IE)

( * ) Notice: Subject to any disclaimer, the term of this patent is extended or adjusted under 35 U.S.C. 154(b) by 507 days.

(21) Appl. No.: 14/143,505

(22) Filed: Dec. 30, 2013

(65) Prior Publication Data

US 2015/0188446 A1  Jul. 2, 2015

(51) Int. Cl.
| | | |
|---|---|---|
| H02J 7/00 | (2006.01) | |
| H02M 7/04 | (2006.01) | |
| H02J 50/12 | (2016.01) | |
| H02M 1/14 | (2006.01) | |
| H02M 1/00 | (2006.01) | |

(52) U.S. Cl.
CPC ............... *H02M 7/04* (2013.01); *H02J 50/12* (2016.02); *H02M 1/143* (2013.01); *H02M 2001/0048* (2013.01)

(58) Field of Classification Search
USPC ........................................................ 320/108
See application file for complete search history.

(56) References Cited

U.S. PATENT DOCUMENTS

| | | | |
|---|---|---|---|
| 2,568,169 A | 9/1951 | Raczynski | |
| 3,484,727 A | 12/1969 | Weber et al. | |
| 4,471,335 A | 9/1984 | Moritz et al. | |
| 4,800,328 A | 1/1989 | Bolger et al. | |
| 4,985,922 A | 1/1991 | Kolbert | |
| 5,477,122 A | 12/1995 | Hall et al. | |
| 5,923,152 A * | 7/1999 | Guerrera | G05F 1/70 323/222 |
| 6,060,875 A * | 5/2000 | Capici | H02M 1/15 323/354 |
| 6,198,375 B1 | 3/2001 | Shafer | |
| 6,967,553 B2 | 11/2005 | Jitaru | |

(Continued)

FOREIGN PATENT DOCUMENTS

| | | |
|---|---|---|
| CN | 102468741 | 5/2012 |
| CN | 202309183 U | 7/2012 |

(Continued)

OTHER PUBLICATIONS

International Search Report and Written Opinion Corresponding to International Application No. PCT/US2014/072667; dated Mar. 25, 2015; 9 Pages.

(Continued)

*Primary Examiner* — Robert Grant
(74) *Attorney, Agent, or Firm* — Ward and Smith, P.A.

(57) ABSTRACT

A method of operating an AC to DC converter circuit can be provided by changing a configuration of a DC output filter circuit to reshape a current waveform in a rectifier circuit, included in the AC to DC converter circuit, based on an operating efficiency of the AC to DC converter circuit. Related circuits and articles of manufacture are also disclosed.

18 Claims, 6 Drawing Sheets

(56) References Cited

U.S. PATENT DOCUMENTS

| | | |
|---|---|---|
| 7,411,479 B2 | 8/2008 | Baarman et al. |
| 7,495,414 B2 | 2/2009 | Hui |
| 7,554,430 B2 | 6/2009 | Mehrotra et al. |
| 7,639,110 B2 | 12/2009 | Baarman et al. |
| 8,138,875 B2 | 3/2012 | Baarman et al. |
| 8,380,998 B2 | 2/2013 | Azancot et al. |
| 8,531,059 B2 | 9/2013 | Ichikawa et al. |
| 8,669,678 B2 | 3/2014 | Urano |
| 8,698,350 B2 | 4/2014 | Kanno |
| 9,006,935 B2 | 4/2015 | Fukushima |
| 9,257,851 B2 | 2/2016 | Baarman |
| 9,705,567 B2 | 7/2017 | Dean |
| 9,859,594 B2 | 1/2018 | Miller et al. |
| 2003/0201860 A1 | 10/2003 | Yang |
| 2006/0049907 A1 | 3/2006 | Liu |
| 2007/0007935 A1 | 1/2007 | Johnson |
| 2008/0122543 A1* | 5/2008 | Silver ............... H03F 1/0255 330/297 |
| 2008/0204116 A1 | 8/2008 | James |
| 2010/0148723 A1 | 6/2010 | Cook |
| 2010/0314946 A1 | 12/2010 | Budde |
| 2011/0049997 A1 | 3/2011 | Urano |
| 2011/0080053 A1 | 4/2011 | Urano |
| 2011/0127845 A1 | 6/2011 | Walley |
| 2011/0127846 A1 | 6/2011 | Urano |
| 2011/0163542 A1 | 7/2011 | Farkas |
| 2011/0304216 A1 | 12/2011 | Baarman |
| 2012/0043825 A1 | 2/2012 | Urano |
| 2012/0049647 A1 | 3/2012 | Kim |
| 2012/0086281 A1 | 4/2012 | Kanno |
| 2012/0112719 A1* | 5/2012 | Xia ............... H02M 1/143 323/282 |
| 2012/0193993 A1 | 8/2012 | Azancot et al. |
| 2012/0200989 A1 | 8/2012 | Byrne et al. |
| 2012/0212068 A1 | 8/2012 | Urano |
| 2012/0280575 A1 | 11/2012 | Kim et al. |
| 2012/0293118 A1 | 11/2012 | Kim et al. |
| 2012/0294045 A1* | 11/2012 | Fornage ............ H02M 7/217 363/17 |
| 2013/0033117 A1 | 2/2013 | Kim et al. |
| 2013/0154382 A1 | 6/2013 | Kurata |
| 2013/0187625 A1 | 7/2013 | Mao |
| 2013/0249304 A1 | 9/2013 | Keeling et al. |
| 2013/0249479 A1 | 9/2013 | Partovi |
| 2013/0328410 A1 | 12/2013 | Georgakopoulos |
| 2014/0049118 A1 | 2/2014 | Karalis et al. |
| 2014/0103730 A1 | 4/2014 | Irie |
| 2014/0125142 A1 | 5/2014 | Kanno |
| 2014/0183967 A1 | 7/2014 | Ryu et al. |
| 2014/0203657 A1 | 7/2014 | Song et al. |
| 2014/0265613 A1 | 9/2014 | Jaskolski |
| 2014/0361628 A1 | 12/2014 | Huang |
| 2015/0091389 A1 | 4/2015 | Byrne et al. |
| 2015/0091522 A1 | 4/2015 | Byrne et al. |
| 2015/0280455 A1 | 10/2015 | Bosshard |
| 2016/0001662 A1* | 1/2016 | Miller ............... B60L 11/005 307/104 |
| 2016/0006356 A1 | 1/2016 | Nirantare |
| 2016/0181821 A1 | 6/2016 | Xu et al. |

FOREIGN PATENT DOCUMENTS

| | | |
|---|---|---|
| CN | 202444333 U | 9/2012 |
| GB | 1134208 | 2/1966 |
| JP | 2006-271027 A | 10/2006 |
| WO | WO 0225677 A2 | 3/2002 |
| WO | WO 2012/046453 A1 | 4/2012 |
| WO | WO 2013/009276 A1 | 1/2013 |
| WO | WO 2013/111243 A1 | 8/2013 |
| WO | WO 2013/124359 A2 | 8/2013 |
| WO | WO 2014/122121 A1 | 8/2014 |

OTHER PUBLICATIONS

International Search Report and Written Opinion Corresponding to International Application No. PCT/IB2015/055004; dated Sep. 15, 2015; 9 Pages.

Chen, Qingbin et al., "The New Electric Shielding Scheme with Comb-shaped Wire and its Applications in SMPS"; College of Electrical Engineering and Automation; Fuzhou University; Fuzhou, Fujian, 350108, China; Published in: Telecommunications Energy (INTELEC), 2011 IEEE 33rd International Conference; Oct. 9-13, 2011; ISSN: 2158-5210; 7 pages.

Nair et al. "Efficiency Enhanced Magnetic Resonance Wireless Power Transfer System and High Voltage Integrated Chip Power Recovery Scheme", *IEEE CONECCT 2014*, Jan. 6-7, 2014.

U.S. Appl. No. 14/143,505 entitled "Methods, Circuits and Articles of Manufacture for Configuring DC Output Filter Circuits" filed Dec. 30, 2013.

U.S. Appl. No. 14/323,436 entitled "Wireless Power Transfer Systems Using Load Feedback" filed Jul. 3, 2014.

International Search Report and Written Opinion Corresponding to International Application No. PCT/US2015/066406; dated Mar. 9, 2016; 11 Pages.

Kelly et al. "Plastic-iron-powder distributed-air-gap magnetic material", 21$^{st}$ Annual IEEE Power Electronics Specialists Conference, Jun. 1990, pp. 25-34.

International Search Report and Written Opinion Corresponding to International Application No. PCT/US2016/031810; dated Jul. 20, 2016; 12 Pages.

International Preliminary Report on Patentability Corresponding to International Application No. PCT/US2014/072667; dated Jul. 14, 2016; 7 Pages.

Braun Toothbrush Teardown, Published on May 29, 2012, EEVblog #284, Retrieved from the Internet at URL https://www.youtube.com/watch?v=JJgKfTW53uo.

Duong et al. "Experimental Results of High-Efficiency Resonant Coupling Wireless Power Transfer Using a Variable Coupling Method", *IEEE Microwave and Wireless Components Letters*, vol. 21, No. 8, Aug. 2011, 3 pages.

Chinese Office Action; corresponding CN Appln No. 201480071548.3, dated Apr. 23, 2018; 15 pages.

\* cited by examiner

METHODS, CIRCUITS AND ARTICLES OF MANUFACTURE FOR CONFIGURING DC OUTPUT FILTER CIRCUITS

BACKGROUND

The present invention relates to DC output filter circuits.

It is known to provide wireless power transfer by near field coupling from a transmitter coil to a receiver coil over distances ranging from about 1 cm to several meters. It is known to use this wireless power transfer to provide wireless charging. Efforts have been made to improve the efficiency of wireless power transfer systems by, for example, optimizing the shape of the coil used to transfer the power, adopting soft switching technology, using Litz wire, and employing new resonant tank structures.

SUMMARY

Embodiments according to the present invention can provide methods, circuits, and articles of manufacture for configuring DC output filter circuits. Pursuant to these embodiments, a method of operating an AC to DC converter circuit can be provided by changing a configuration of a DC output filter circuit to reshape a current waveform in a rectifier circuit, included in the AC to DC converter circuit, based on an operating efficiency of the AC to DC converter circuit.

DETAILED DESCRIPTION OF EMBODIMENTS ACCORDING TO THE INVENTION

Figure 1:
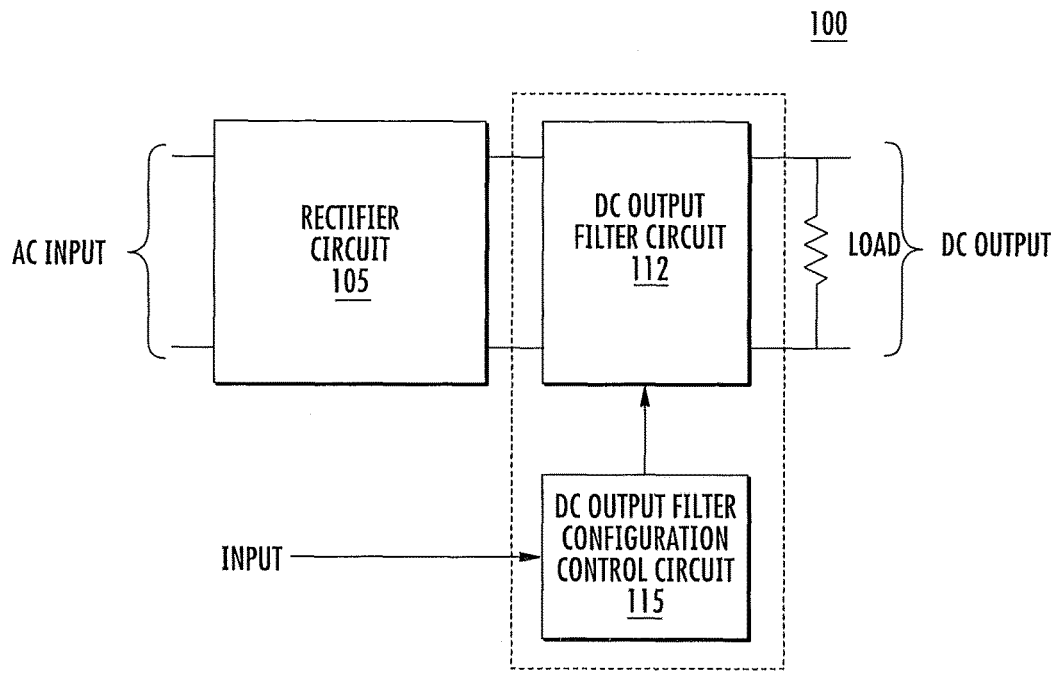
FIG. 1 is a block diagram illustrating AC to DC converter circuits in some embodiments according to the invention.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As described herein, in some embodiments according to the invention, a variable output impedance rectifier circuit can be provided by changing the configuration of a filter circuit to more closely match a changing impedance of a load presented to the variable output impedance rectifier circuit, such as during wireless power transfer. Changing the filter circuit configuration to more closely match the impedance of the load may cause a current waveform in the rectifier circuit to be reshaped as the impedance of the load varies.

As further described herein, in some embodiments according to the invention, improved operating efficiency may be achieved by changing a configuration of a DC output filter circuit to reshape the current waveform in the rectifier circuit that is coupled to the DC output filter. As appreciated by the present inventors, the configuration can be changed when doing so may increase the operating efficiency of a circuit in which the DC output filter circuit is utilized, such as an AC to DC converter circuit or a wireless power transfer system. For example, in some embodiments according to the invention, when the load placed on the AC to DC converter circuit is relatively low, the filter circuit can be configured as a capacitive (C) filter (i.e., to include a capacitive circuit element), whereas when the load increases, the filter circuit can be reconfigured as a capacitive-inductive (LC) filter (e.g., to add an inductive circuit element to the capacitive circuit element).

Shaping the current waveform in the rectifier can include creating the current waveform to have a specified peak current over a specified time interval and eliminate (or reduce) losses associated with the inductive circuit element in the LC filter when, for example, the C filter configuration is to be used (when the load placed on the DC output filter circuit is low). The current waveform can be reshaped to reduce the current level of the waveform from the peak to a lesser value which is extended over a greater time interval, when the LC filter configuration is called for (when the load placed on the DC output filter circuit becomes heavier).

In some embodiments according to the invention, the DC output filter circuit can be configured to include a capacitive circuit element across the output when the load is relatively small. When the load increases, however, the DC output filter circuit can be reconfigured to include an inductive circuit element in series with the capacitive circuit element to reshape the current waveform as described herein.

In some embodiments according to the invention, the change in configuration of the DC output filter circuit can be provided by utilizing predetermined operating efficiency curves for each of the configurations supported by the DC output filter circuit. In operation, a controller circuit can determine which of the configurations for the DC output filter circuit can provide the highest efficiency based on, for example, the power delivered to the load. In some embodiments according to the invention, the configuration of the DC output filter circuit can be modified temporarily to determine if a different configuration may provide better operating efficiency compared to the operating efficiency provided by the current configuration of the DC output filter circuit. Accordingly, a reconfigurable DC output filter circuit can be utilized to provide improved overall efficiency for an AC to DC converter circuit that is subjected to variation in the load applied thereto.

In some embodiments according to the invention, the AC to DC converter circuit can be utilized in a wireless power transfer system. In some embodiments according to the invention, the AC to DC converter circuit can be utilized in a wireless charging system which can be coupled to, for example, a battery as the load. In some embodiments according to the invention, the AC to DC converter circuit can be utilized to power a load, such as a motor, sensor, lights, or other electrical equipment. In some embodiments according to the invention, the AC to DC converter circuit can be used to provide electrical isolation for loads. The wireless power transfer system according to the present invention may be used in other applications as well.

FIG. 1 is a block diagram illustrating an AC to DC converter circuit 100 in some embodiments according to the invention. According to FIG. 1, an AC input is provided to a rectifier circuit 105 that provides a current to a DC output filter circuit 112. It will be understood that the AC input can be any type of AC input signal that can be subjected to AC to DC conversion.

The DC output filter circuit 112 operates to shape the current waveform provided by the rectifier circuit based on the operating efficiency of the AC to DC converter circuit in some embodiments according to the invention. In particular, the DC output filter circuit 112 can be configured based on an input to a DC filter configuration control circuit 115, which can select the configuration of the DC output filter circuit 112 to shape the current waveform to improve operating efficiency. It will be understood that the DC filter configuration control circuit 115 can control the configuration of the DC output filter circuit 112 based on an input, the state of which indicates the selected configuration of the DC output filter circuit 112.

It will be understood that the DC output filter circuit 112 can include any combination of passive or active components that can be used to shape the current waveform provided by the rectifier circuit 105 to tailor the shape of the current waveform to provide an improved operational efficiency. It will be understood that the DC filter configuration control circuit 115 can include any type of control logic and/or components that can change the configuration of the DC output filter circuit 112 to shape the current wave form in the rectifier circuit 105. For example, in some embodiments according to the invention, the DC filter configuration control circuit 115 can be a switch that switches in/out circuit components to provide the selected DC output filter circuit configuration to improve the operational efficiency. In some embodiments according to the invention, the DC filter configuration control circuit 115 can be an electromechanical contactor, relay, a solid state switch, or any combination of these components. In some embodiments according to the invention, the DC filter configuration control circuit 115 can include programmable control elements that can carry out computer readable program code to select the configuration of the DC output filter circuit 112.

Figure 8:
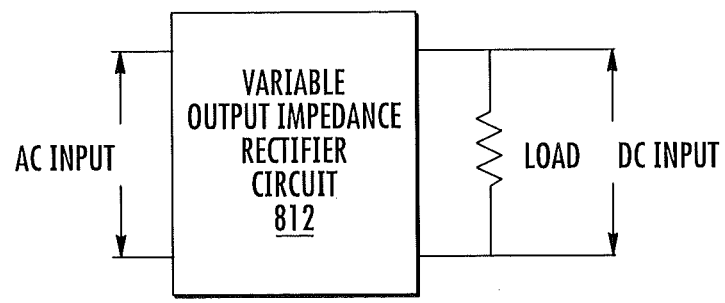
FIG. 8 is a block diagram illustrating AC to DC converter circuits including a variable output impedance rectifier circuit in some embodiments according to the invention.

As shown in FIG. 8, the elements of the DC output filter circuit 112 can be incorporated into the rectifier circuit to provide a variable output impedance rectifier circuit 812. In particular, the circuit elements included in the DC output filter circuit 112 can be included in various portions of the variable output impedance rectifier circuit 812, such as at the input to the rectifier circuit 812 and/or at the output of the rectifier circuit 812. In operation, the variable output impedance rectifier circuit 812 changes its output impedance (by changing the configuration of the filter elements) to more closely match a changing impedance of the load presented to the variable output impedance rectifier circuit 812. Changing the filter circuit configuration to more closely match the impedance of the load may cause a current waveform in the rectifier circuit to be reshaped as the impedance of the load varies.

Figure 2:
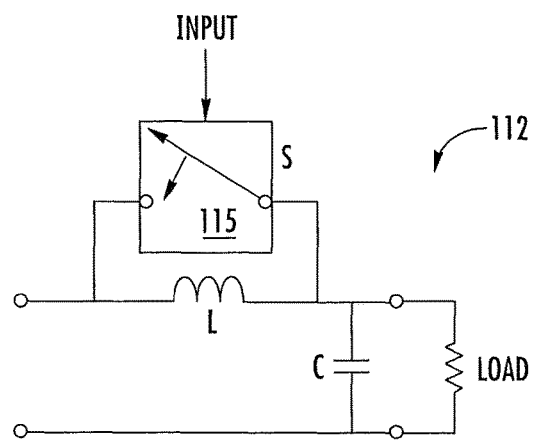
FIG. 2 is a schematic diagram illustrating configurable DC output filter circuits coupled to DC filter configuration control circuits in some embodiments according to the invention.

FIG. 2 is a schematic illustration of the DC output filter circuit 112 coupled to the DC filter configuration control circuit 115 in some embodiments according to the invention. According to FIG. 2, the DC output filter circuit 112 includes an inductive circuit element L coupled in series with a capacitive circuit element C across which a load can be coupled.

Figure 7A:
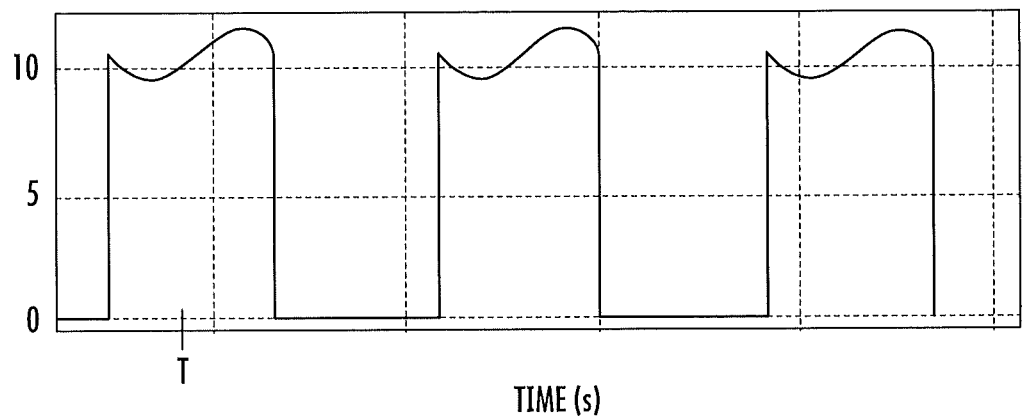
FIGS. 7A and 7B are graphs illustrating different shaped current waveforms provided using DC output filter circuits in different configurations in some embodiments according to the invention.
Figure 7B:
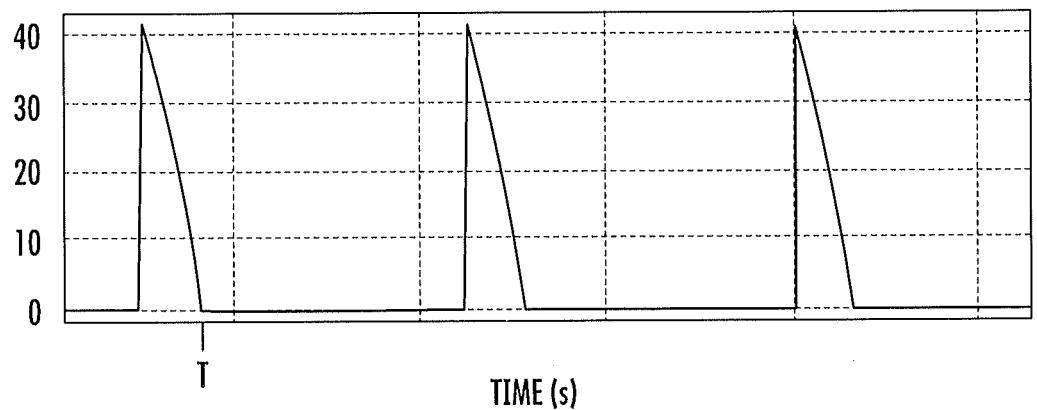

As further shown in FIG. 2, the DC filter configuration control circuit 115 can be provided by a switch coupled across the inductive circuit element L which opens/closes in response to the state of the input signal. For example, in some embodiments according to the invention, the state of the input signal is manipulated to close the DC filter configuration control circuit 115 to bypass the inductive circuit element L so that the configuration of the DC output filter circuit 112 includes the capacitive circuit element C across the load. As described herein, the capacitive circuit element C can be included in the DC output filter circuit 112 when to do so would yield a greater operational efficiency for the AC to DC converter circuit 100 by shaping the current waveform provided by the rectifier circuit 105 to resemble the waveform shown, for example in FIG. 7B, so that the peak current can be provided over a time interval T, such as when the load is relatively light.

Further according to FIG. 2, the state of the input signal can be manipulated to open the DC filter configuration control circuit 115 to include the inductive circuit element L in series with the capacitive circuit element C to configured the DC output filter circuit 112 as an LC filter. When the inductive circuit element L is included in the configuration of the DC output filter circuit 112, the current waveform provided by the rectifier circuit 105 can be changed from that shown in FIG. 7B to that shown in FIG. 7A so that the current is reduced from the peak shown in FIG. 7B (to about ¼ of that shown in FIG. 7B) but is extended to a time interval that is greater than T, so that improved operational efficiency may be provided, such as when the load is greater than that shown being carried in FIG. 7A.

Figure 3:
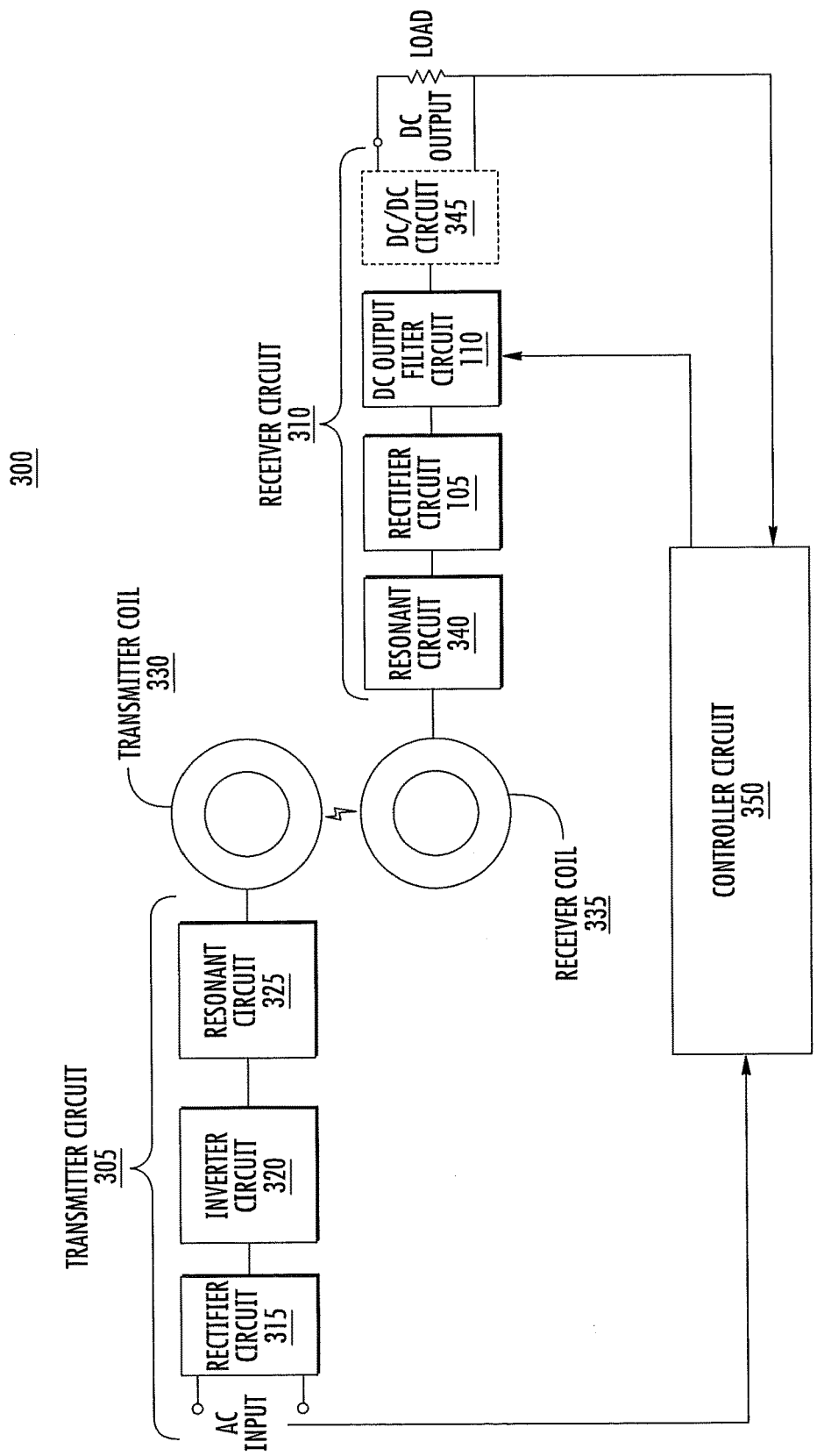
FIG. 3 is a block diagram illustrating a wireless power transfer system for wireless power transfer including configurable DC output filter circuits in some embodiments according to the invention.

FIG. 3 is block diagram illustrating a wireless power transfer or power transfer system 300 including the DC output filter circuit 112 coupled to the DC filter configuration control circuit 115 to select a configuration determined by a controller circuit 350 in some embodiments according to the invention. According to FIG. 3, the wireless power transfer system 300 includes a transmitter circuit 305 that can be wirelessly coupled to a receiver circuit 310. In the transmitter circuit 305, an AC input signal is provided to a rectifier circuit 315 to provide a rectified signal to an inverter circuit 320 that operates to provide an AC signal to a transmitter resonant circuit 325 coupled to a transmitter coil 330. The transmitter circuit 305 is configured to generate an AC signal that can be transferred via the transmitter coil 330 across a gap 331 to the receiver circuit 310 via a receiver coil 33.

The transferred AC signal is provided to a receiver resonant circuit 340 that is coupled to the rectifier circuit 105, which provides the current waveform for the DC output filter circuit 112 (configured responsive to the DC filter configuration control circuit 115). It will be understood that the DC output filter circuit 112 can be optionally coupled to a DC/DC circuit 345 that drives the load. It will be further understood that a variety of circuit types, may be utilized as the DC/DC circuit 345 downstream from the DC output filter circuit 112, such as a buck converter circuit, a boost converter circuit or the like.

It will be understood that the load can vary based on the state of, for example, a battery that is included within the load. In some embodiments according to the invention, the battery is included in an electric vehicle that is configured for charging by the wireless power transfer system 300. Other types of devices may also be configured for use with the wireless power transfer system 300, including devices that do not necessarily include a battery. For example, the device may present a variable load as described herein, but may not be charged.

According to FIG. 3, the controller circuit 350 coordinates operation of the transmitter circuit 305 and the receiver circuit 310 to provide the operations described herein. For example, in some embodiments according to the invention, the controller circuit 350 can receive the AC input signal and the DC output signal (for example, from the receiver circuit 310). The controller circuit 350 can also provide the control signal to the DC filter configuration control circuit 115 to control the configuration as described herein.

In some embodiments according to the invention, the controller circuit 350 can select the configuration based on predetermined efficiency curves that represent determined efficiencies for the wireless power transfer system 300 over a range of loads for each configuration. For example, according to FIGS. 4A and 4B, prior to coupling to the load (such as during design, development, or manufacturing of the wireless power transfer system 300), the receiver circuit 310 can be used to charge (or carry) a load that varies over a range reflecting anticipated actual usage so that a range of expected output powers are provided by the receiver circuit 310. Accordingly, the DC output filter circuit 112 can be coupled to the range of loads and the efficiency of each configuration can be determined over that range for each configuration.

In operation, the controller circuit 350 can change the configuration of the DC output filter circuit 112 to provide improved operational efficiency over the entire range of output power provided to the load. For example, as shown in FIGS. 4A and 4B, when the output power provided to the load is relatively low (i.e., less than about 2500 watts), the DC output filter circuit 112 can be configured to bypass the inductive circuit element L to provide a capacitive filter (C), as the predetermined efficiency curves indicate that a capacitive filter provides the highest efficiency for the wireless power transfer system 300.

When, however, the output power provided to the load exceeds about 2500 Watts, the efficiency of the capacitive configuration for the DC output filter circuit 112 is determined to be less than that provided by the LC configuration for the DC output filter circuit 112. In particular, as shown in FIGS. 4A and 4B, the LC configuration for the DC output filter circuit 112 provides a greater operational efficiency compared to the capacitive filter. Accordingly, in operation, when the predetermined efficiency curves for the different filter configurations indicate that greater operational efficiency would be achieved if the filter configuration were changed, the controller circuit 350 can change the state of the input signal to reconfigure the DC output filter circuit 112 to provide greater operational efficiency for the wireless power transfer system 300.

Figure 4A:
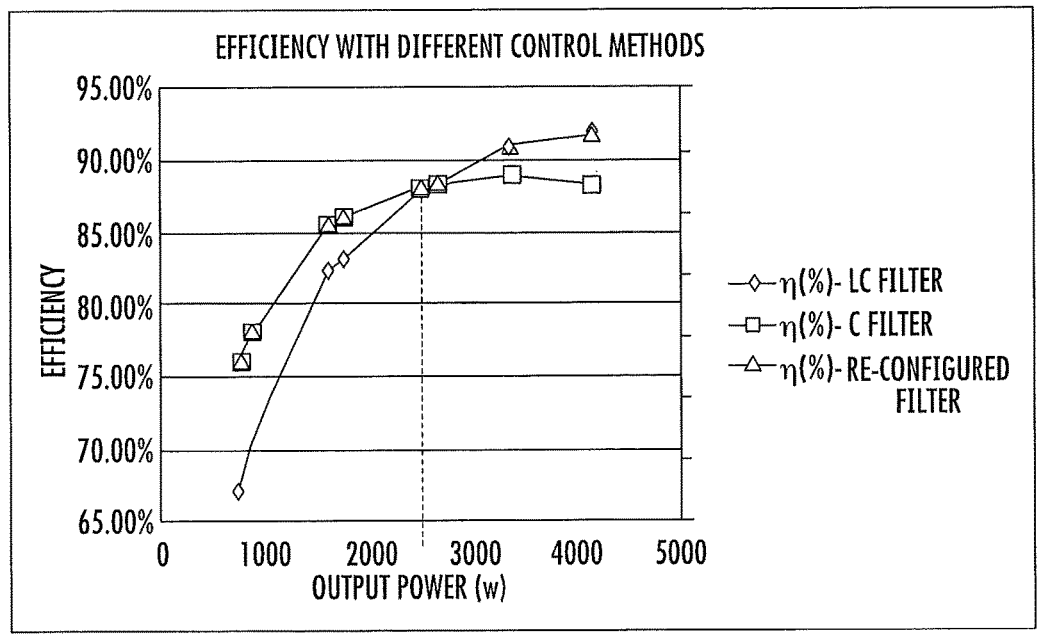
FIGS. 4A and 4B illustrate respective efficiencies over a range of output power associated with wireless power transfer systems utilizing configurable DC output filter circuits in some embodiments according to the invention.
Figure 4B:
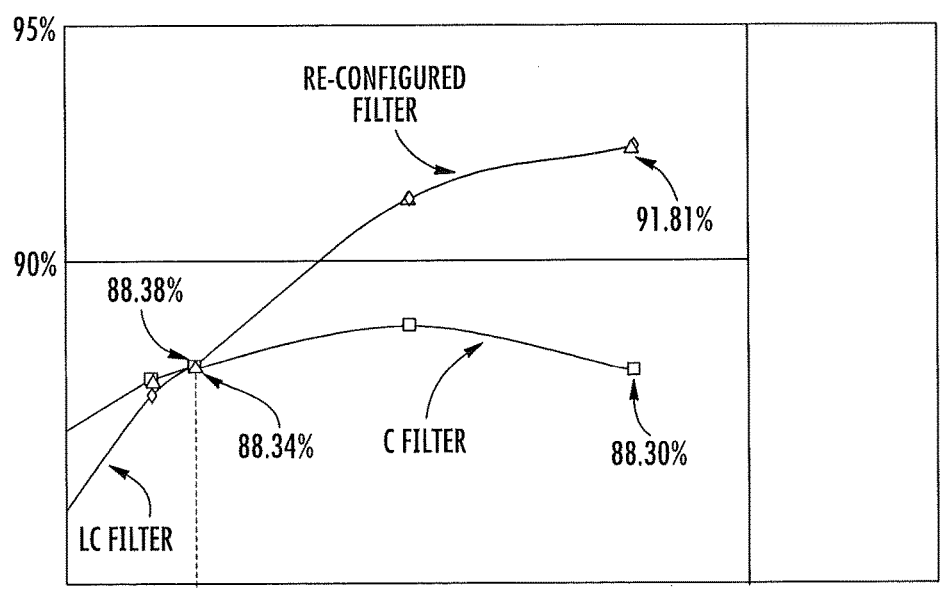

Further according to FIGS. 4A and 4B, the efficiency of the DC output filter circuit 112 configured as a capacitive filter is greater than that of the DC output filter circuit 112 when configured as an LC filter from operating at an output power from about 800 Watts to about 2500 Watts. Above 2500 Watts, however, the efficiency of the circuit can be increased if the configuration is changed from a capacitive filter to the LC filter as shown in more detail in FIG. 4B. Accordingly, the wireless power transfer system 300 can be subjected to testing during development or manufacturing to determine at which point in the output power the configuration of the DC output filter circuit should be changed to provide greater operating efficiency above the predetermined power output level when the configuration is changed. It will be understood that the predetermined efficiency curves for other systems may be different than those shown in FIGS. 4A and 4B. It will also be understood that the curves may actually be represented and/or utilized by the controller circuit 350 as points below where a particular configuration is to be used and above which another particular configuration is to be used. Still further, more than two configurations may be supported and utilized.

In some embodiments according to the invention, the predetermined efficiency curves can updated after deployment of the wireless power transfer system 300. For example, the controller circuit 350 may be coupled to a communication system whereby updated predetermined efficiency curves may be uploaded to the controller circuit when, for example, the wireless power transfer system 300 is connected to another device so that the points where the DC output filter circuit 112 is reconfigured is different. In some embodiments according to the invention, the controller circuit 350 stores (or has access to) a number of predetermined efficiency curves, where a selected group can be utilized by the controller circuit 350 based on the device coupled to the wireless power transfer system 300. In some embodiments according to the invention, the device can communicate with the controller circuit 350 to indentify which predetermined efficiency curves are to be used. In some embodiments according to the invention, the device itself may provide the predetermined efficiency curves for use by the wireless power transfer system 300. It will be further understood that embodiments according to the present invention as illustrated in FIGS. 4A and 4B can also be utilized in any type of wireless power transfer system described herein.

It will be further understood that the controller circuit 350 can control other operations of the wireless power transfer system 300, such the operating frequency of the inverter circuit 320. Accordingly, the controller circuit 350 can located in the transmitter circuit 305, the receiver circuit 310, in a separate unit or any combination of these units. It will also be understood that the controller circuit 350 may receive the AC input signal and the DC output directly or may receive an indication of the values of those signals. Furthermore, those indications may be provided by cabling or wirelessly to the controller circuit 350. In still further embodiments according to the invention, the indications (as well as other information) may be provided to the transmitter circuit and/or to the receiver circuit 310 via modulation of the transmitted signal between the coils 330 and 335.

Figure 5:
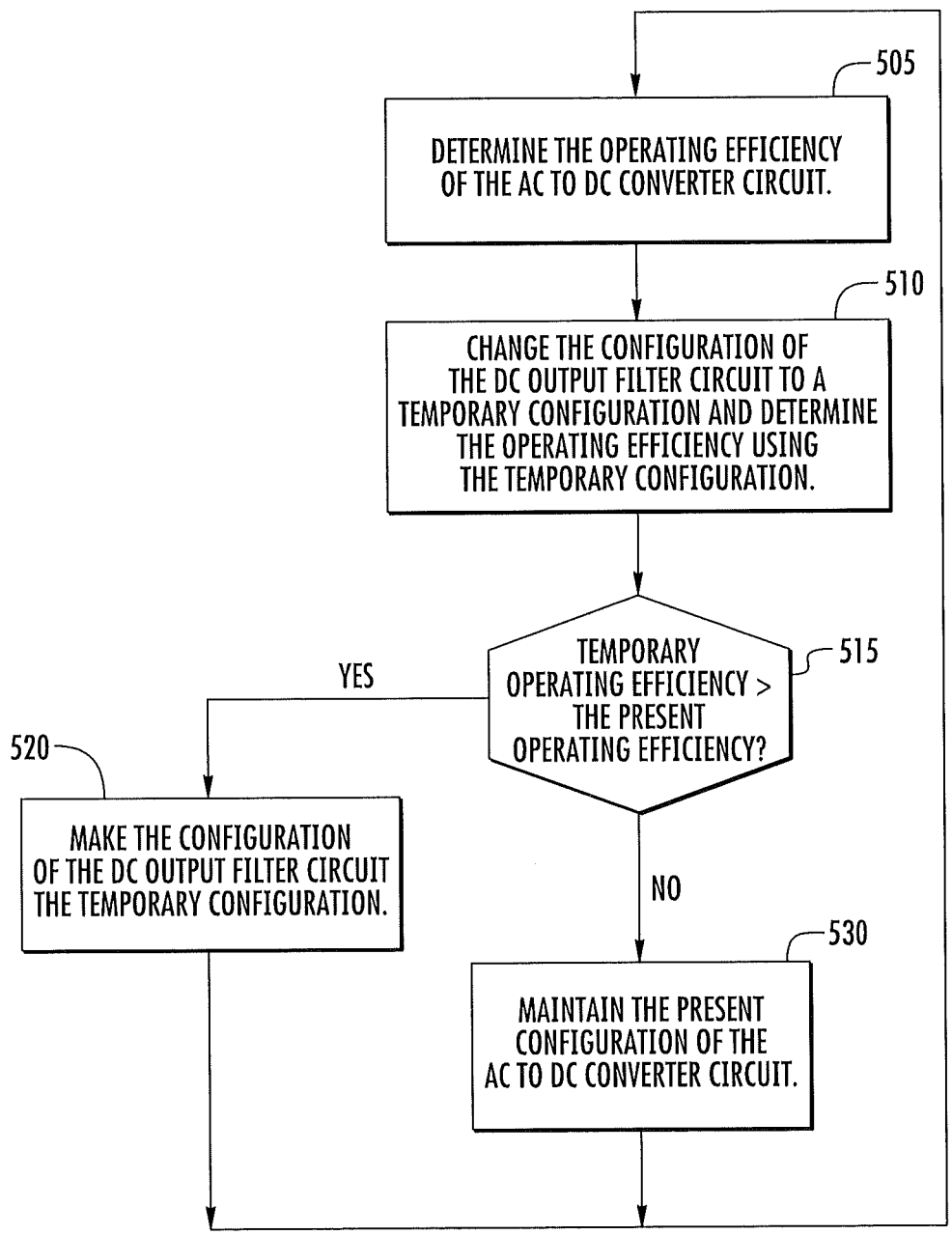
FIGS. 5 and 6 are flowcharts illustrating operations of wireless power transfer systems in some embodiments according to the invention.

FIG. 5 is a flow chart illustrating operations of the wireless power transfer system 300 shown in FIG. 3 in some embodiments according to the invention. According to FIG. 5, the wireless power transfer system 300 can provide improved operational efficiency by dynamically adjusting the configuration of the DC output filter circuit 112 in determining whether the new configuration provides improved operating efficiency compared to that provided by the current configuration of the DC output filter circuit 112.

Referring to FIG. 5, the controller circuit 350 can determine the operating efficiency of the wireless power transfer system (Block 505), using the DC output and the AC input. The controller circuit 350 can change the configuration of the DC output filter circuit 112 to a temporary configuration and then determine the operating efficiency using that temporary configuration (Block 510). For example, in some embodiments according to the invention, when the DC output filter circuit 112 is configured to provide a capacitive filter by bypassing the inductive circuit element L, the controller circuit 350 can change the configuration of the DC output filter circuit 112 to open the DC filter configuration control circuit 115 thereby including the inductive circuit element L to configure the DC output filter circuit 112 as an LC filter.

The controller circuit 350 can then determine if the temporary operating efficiency (provided by the temporary configuration of the DC output filter circuit 112) is greater than that provided by the present configuration (Block 515). If the temporary operating efficiency is greater than the present operating efficiency (Block 515), the controller circuit 350 can make the configuration of the DC output filter circuit 112 the new present operating configuration of the DC output filter circuit 112 (Block 520). If, however, the temporary operating efficiency is less than the present operation efficiency (Block 515), the controller circuit 350 can maintain the configuration of the DC output filter circuit 112 in the present state to maintain higher operating efficiency (Block 530). Operations can then continue (Block 520, Block 530) at Block 505 as the wireless power transfer system 300 continues to operate. It will be understood that the operations described above can occur in a different order when, for example, the controller circuit 350 changes from an LC configuration to a C configuration to determine if the new configuration provides improved efficiency.

Figure 6:
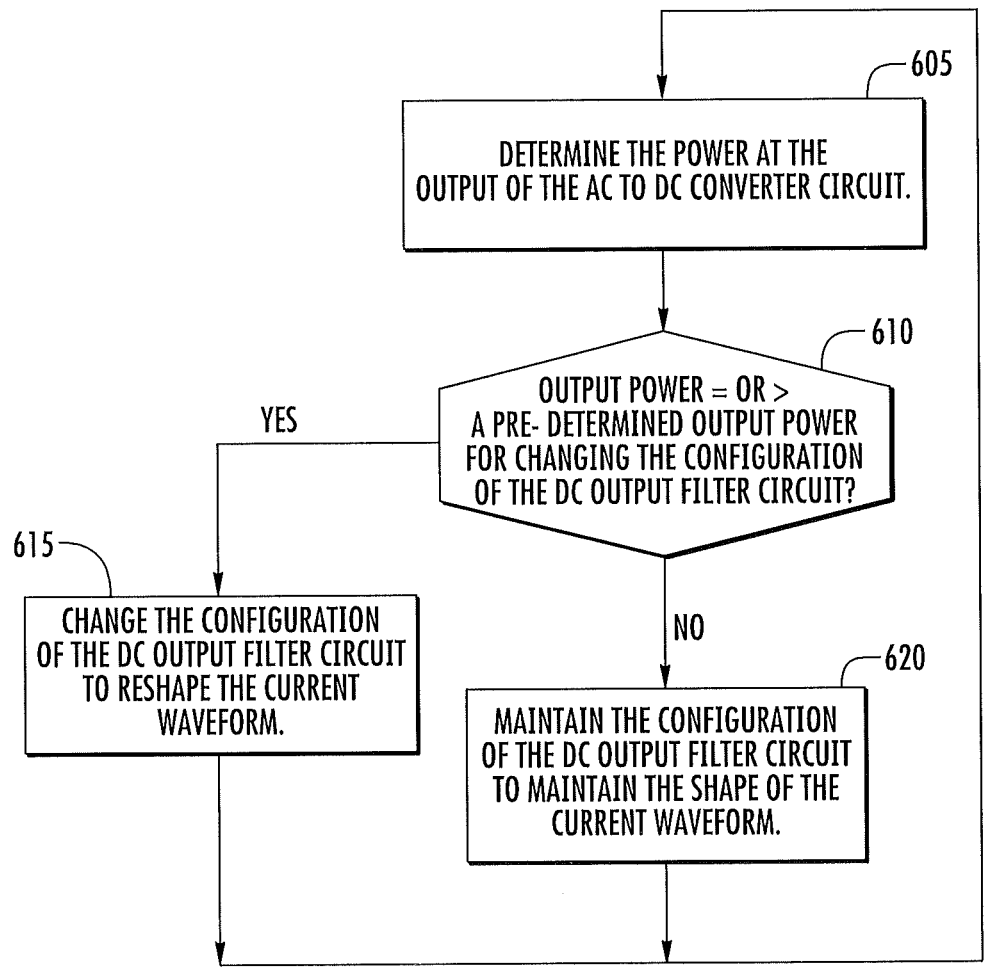

FIG. 6 is a flowchart illustrating operations of the wireless power transfer system 300 shown in FIG. 3 in some embodiments according to the invention. According to FIG. 6, the DC output filter circuit 112 can be configured based on predetermined efficiencies over a range of output power provided to a test load as shown for example in FIGS. 4A and 4B and as described herein. According to FIG. 6, the controller circuit 350 determines (or is provided with) the power at the output of the wireless power transfer system 300 (Block 605) and determines whether the output power is greater than or equal to a predetermined output power where the configuration of the DC output filter circuit should be changed to improve the operating efficiency (Block 610).

If the output power is greater than or equal to the predetermined output power (Block 610), the DC output filter circuit configuration is changed to reshape the current waveform provided in the rectifier circuit 105 (Block 615). If, however, the output power is less than the predetermined output power (Block 610), the controller circuit 350 maintains the configuration of the DC output filter circuit to maintain the shape of the current wave form provided in the rectifier circuit 105 (Block 620). Thereafter, operations of the power transfer of the controller circuit 350 can continue at Block 605 as the DC output to the load changes.

As described herein, in some embodiments according to the invention, improved operating efficiency may be achieved by changing a configuration of a DC output filter circuit to reshape a current waveform in a rectifier circuit that is coupled to the DC output filter. As appreciated by the present inventors, the configuration can be changed when doing so may increase the operating efficiency of a circuit in which the DC output filter circuit is utilized, such as in an AC to DC converter circuit of a wireless power transfer system. For example, in some embodiments according to the invention, when the load placed on the AC to DC converter circuit is relatively low, the filter circuit can be configured as a capacitive (C) filter (i.e., to include a capacitive circuit element), whereas when the load increases, the filter circuit can be reconfigured as a capacitive-inductive (LC) filter (e.g., to add an inductive circuit element to the capacitive circuit element).

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, circuits and articles of manufacture including computer readable code according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor or controller circuit of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

What is claimed:

1. A method of operating an AC to DC converter circuit, the method comprising:
   changing a configuration of a DC output filter circuit by switching an inductive circuit element from being in series with a capacitive circuit element to being bypassed and to maintain the capacitive circuit element across an output of the DC output filter circuit, to reshape a current waveform in a rectifier circuit, included in the AC to DC converter circuit, based on an operating efficiency of the AC to DC converter circuit;
   wherein changing a configuration of a DC output filter circuit comprises:
   configuring the DC output filter circuit so that the current waveform includes a peak current over a time interval; and
   changing the configuration of the DC output filter circuit to reduce the peak current and to extend the current waveform to a time beyond the time interval;
   wherein configuring the DC output filter circuit comprises configuring the DC output filter circuit to include the capacitive circuit element, wherein changing the configuration of the DC output filter circuit comprises switching the inductive circuit element into series with the capacitive circuit element.

2. The method of claim 1 wherein switching the inductive circuit element into series with the capacitive circuit element comprises opening a bypass switch coupled across the inductive circuit element.

3. The method of claim 1 wherein changing a configuration of a DC output filter circuit comprises:
   determining the operating efficiency of the AC to DC converter circuit using a present configuration to provide a present operating efficiency;
   changing the configuration of the DC output filter circuit to a temporary configuration;
   determining the operating efficiency of the AC to DC converter circuit using the temporary configuration to provide a temporary operating efficiency;
   making the present configuration of the DC output filter circuit equal to the temporary configuration if the temporary operating efficiency is greater than the present operating efficiency; and
   maintaining the present configuration of the AC to DC converter circuit if the temporary operating efficiency is less than or equal to the present operating efficiency.

4. The method of claim 3 wherein determining the operating efficiency of the AC to DC converter circuit comprises determining the operating efficiency of the AC to DC converter circuit based on a voltage and a current at an output of the AC to DC converter circuit and a voltage and a current at an input to the AC to DC converter circuit.

5. The method of claim 1 wherein changing a configuration of a DC output filter circuit comprises:
determining a power at an output of the AC to DC converter circuit to provide an output power;
comparing the output power to a pre-determined output power for changing the configuration of the DC output filter circuit;
changing the configuration of the DC output filter circuit if the output power is equal to or greater than the pre-determined output power to reshape the current waveform; and
maintaining the configuration of the DC output filter circuit if the output power is less than the pre-determined output power to maintain a shape of the current waveform.

6. The method of claim 5 wherein the pre-determined output power for changing the configuration of the DC output filter circuit is determined before determining the power at the output of the AC to DC converter circuit.

7. The method of claim 6 wherein determining a power at an output of the AC to DC converter circuit to provide an output power is preceded by:
determining the operational efficiency of the AC to DC converter circuit for different configurations of the DC output filter circuit over a range of output powers.

8. The method of claim 1 wherein the AC to DC converter circuit comprises a wireless power transfer system.

9. The method of claim 8 wherein the wireless power transfer system comprises a wireless charging system.

10. An AC to DC converter circuit, comprising:
an AC to DC rectifier circuit configured to provide a current waveform; and
a configurable DC output filter circuit, coupled to the AC to DC rectifier circuit, configured to reshape the current waveform based on an operating efficiency of the AC to DC converter circuit, wherein the configurable DC output filter circuit further comprises:
a capacitive circuit element configured to coupling across a load of the AC to DC converter circuit;
an inductive circuit element coupled in series with the capacitive circuit element; and
a bypass switch, coupled in parallel with the inductive circuit element.

11. The circuit of claim 10 wherein the configurable DC output filter circuit is configured to shape the current waveform to include a peak current over a time interval responsive to a first state of a DC output filter circuit control signal and is configured to change the shape of the current waveform to reduce the peak current and to extend the current waveform to a time beyond the time interval responsive to a second state of the DC output filter circuit control signal.

12. The circuit of claim 11 wherein the bypass switch is configured to open/close responsive to the first and second states of the DC output filter circuit control signal.

13. The circuit of claim 12 wherein the first state of the DC output filter circuit control signal closes the bypass switch to configure the configurable DC output filter circuit as a capacitive filter circuit; and
wherein the second state of the DC output filter circuit control signal opens the bypass switch to reconfigure the configurable DC output filter circuit as an inductive-capacitive filter circuit.

14. The circuit of claim 11 further comprising:
a controller circuit operatively coupled to the configurable DC output filter circuit and configured to provide the DC output filter circuit control signal, wherein the controller circuit is configured to determine the operating efficiency of the AC to DC converter circuit using a present configuration of the configurable DC output filter circuit to provide a present operating efficiency, and configured to change the present configuration of the configurable DC output filter circuit to temporary configuration, and configured to determine the operating efficiency of the AC to DC converter circuit using the temporary configuration to provide a temporary operating efficiency, and configured to make the present configuration of the configurable DC output filter circuit equal to the temporary configuration, using the second state, if the temporary operating efficiency is greater than the present operating efficiency, and is configured to maintain the present configuration of the AC to DC converter circuit, using the first state, if the temporary operating efficiency is less than or equal to the present operating efficiency.

15. The circuit of claim 11 further comprising:
a controller circuit operatively coupled to the configurable DC output filter circuit and configured to provide the DC output filter circuit control signal, wherein the controller circuit is configured to determine a power at an output of the AC to DC converter circuit to provide an output power, and configured to compare the output power to a pre-determined output power for changing a present configuration of the configurable DC output filter circuit, and configured to change the present configuration of the configurable DC output filter circuit, using the second state, if the output power is equal to or greater than the pre-determined output power to reshape the current waveform, and is configured to maintain the present configuration of the configurable DC output filter circuit, using the first state, if the output power is less than the pre-determined output power to maintain a shape of the current waveform.

16. The circuit of claim 10 wherein the configurable DC output filter circuit is included in a receiver circuit of a wireless power transfer system.

17. The circuit of claim 16 wherein the wireless power transfer system comprises a wireless charging system.

18. An article of manufacture for operating an AC to DC converter circuit, comprising:
a non-transitory computer readable storage medium having computer readable program code embodied therein, the computer readable program code comprising:
computer readable program code configured to change a configuration of a DC output filter circuit by switching an inductive circuit element from being in series with a capacitive circuit element to being bypassed and to maintain the capacitive circuit element across an output of the DC output filter circuit, to reshape a current waveform in an AC to DC rectifier circuit, included in the AC to DC converter circuit, based on an operating efficiency of the AC to DC converter circuit;
wherein the computer readable program code configured to change a configuration of a DC output filter circuit comprises:
computer redable program code configured to configure the DC output filter circuit so that the current waveform includes a peak current over a time interval; and
computer readable program code configured to change the configuration of the DC output filter circuit to reduce the peak current and to extend the current waveform to a time beyond the time interval;
wherein the computer readable program code configured to configure the DC output filter circuit comprises computer readable program code configured to configure the DC output filter circuit to include a capacitive circuit element, and the computer readable program code configured to change the configuration of the DC output filter circuit comprises computer redable program code configured to switch the inductive circuit element into series with the capacitive circuit element.

\* \* \* \* \*

UNITED STATES PATENT AND TRADEMARK OFFICE
CERTIFICATE OF CORRECTION

PATENT NO. : 10,116,230 B2
APPLICATION NO. : 14/143505
DATED : October 30, 2018
INVENTOR(S) : Tangshun Wu, Jr. et al.

It is certified that error appears in the above-identified patent and that said Letters Patent is hereby corrected as shown below:

In the Claims

Column 11, Line 38, Claim 10 please change "to" to -- for --

Column 12, Line 5, Claim 14 following "to" please add -- a --

Signed and Sealed this
Eleventh Day of December, 2018

Andrei Iancu
*Director of the United States Patent and Trademark Office*